UNITED STATES PATENT OFFICE.

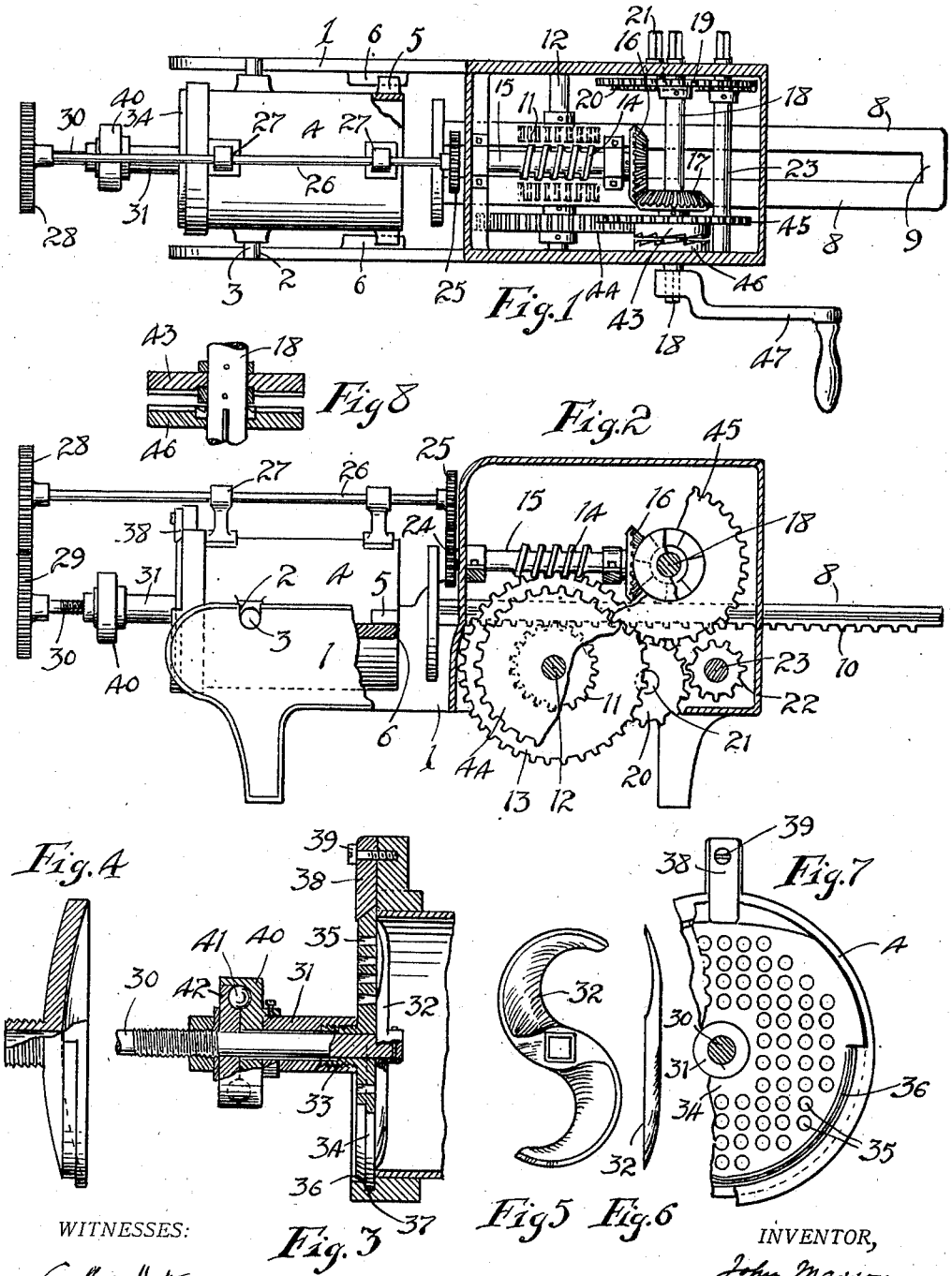

JOHN MASSON, OF BYRON, CALIFORNIA.

MEAT AND SAUSAGE CUTTER.

1,036,870.  Specification of Letters Patent.  Patented Aug. 27, 1912.

Application filed August 31, 1908, Serial No. 450,925. Renewed February 14, 1912. Serial No. 677,466.

*To all whom it may concern:*

Be it known that I, JOHN MASSON, a citizen of the United States, residing at Byron, in the county of Contra Costa and State of California, have invented new and useful Improvements in Meat and Sausage Cutters, of which the following is a specification.

This invention relates to an improved meat and sausage cutter, the objects of the invention being to provide an apparatus of this character which will be convenient in operation, which will positively feed the meat to the cutter without permitting any backward dip thereof past the feeding mechanism, and especially which will provide means for cutting the meat with a very rapid motion, thus cutting with a clean cut, and rendering the device effective, uniform and speedy in its action.

Further objects of the invention are to provide means whereby the feeding device will advance with as little friction as possible and the revolving parts move smoothly and with little friction, thus economizing power; to provide means for quickly withdrawing the feeding device from the meat receptacle in order to replenish the latter with meat; and to provide an improved form of cutter.

In the accompanying drawing, Figure 1 is a broken plan view of my improved apparatus; Fig. 2 is a broken side view of the same; Fig. 3 is an enlarged longitudinal sectional view of the end of the cylinder; Fig. 4 is a sectional view of a stuffing plate; Fig. 5 is a front view of the cutter; Fig. 6 is a side view thereof; Fig. 7 is a broken front view of the perforated plate; Fig. 8 is a sectional view of the ratchet wheels.

Referring to the drawing, 1 indicates a suitable frame having bearings 2, for trunnions 3 of a cylinder 4, said bearings being open at the top, as shown, to permit said trunnions to be readily placed upon said bearings and removed therefrom. Said cylinder is provided at its sides, adjacent to its open end or mouth, with horizontally and outwardly extending lugs 5, which are adapted when the cylinder is in position to rest upon shoulders 6 formed upon, and extending inwardly from, the frame of the apparatus. Through the ends of the frame slide two parallel stems 8 joined at their rear ends, as shown at 9, and formed at their under sides into racks 10. By means of these racks the plunger is advanced in the cylinder. They mesh with pinions 11 on a transverse shaft 12 carrying a worm wheel 13 driven by a worm 14, on a longitudinal shaft 15 carrying a miter gear 16 which meshes with a miter gear 17 on a transverse shaft 18 which carries a gear wheel 19 which meshes with a gear wheel 20 on a shaft 21 and which meshes with a gear whel 22 on a transverse shaft 23.

By applying a crank handle to either of the shafts 23, 21, 18, the longitudinal shaft 15 can be rotated rapidly and at the same time the worm wheel and transverse shaft 12 can be driven slowly and thereby the plunger slowly advanced. Said longitudinal shaft 15 carries upon its forward end a gear wheel 24, which meshes with a gear wheel 25 on a longitudinal shaft 26 rotating in bearings 27 formed upon the upper side of the cylinder, which shaft carries, at its forward end, a gear wheel 28 which engages a pinion 29 secured upon a shaft 30 which passes through a sleeve 31, said shaft carrying at its inner end a knife 32 having curved blades. Said sleeve 31 is screwed on to the hub 33, of a plate 34 having apertures 35 through which the meat is forced. Said plate is circular to correspond in form with the end of the cylinder, and the lower half thereof is formed on the outside with a beveled edge 36, which beveled edge fits in a groove 37 formed upon the lower half of the corresponding end of the cylinder. Consequently said plate can be removed from the cylinder merely by raising it sufficiently to allow the edge of the plate to clear the edge of the groove, whereupon said plate can be removed longitudinally. When in position, said plate is held in place by means of a clamping arm 38 which turns upon a screw 39 projecting from a block formed upon the cylinder, the lower end of said clamping arm being beveled to fit tightly against the beveled portion of the top of the plate. Upon the outer end of said sleeve is secured an annular disk 40 having a circular channel forming a runway for balls 41, a second disk 42 having a co-registering channel, being secured on the shaft. These balls reduce the friction of the shaft rotating in the sleeve. This construction permits of the ready turning of the cylinder to fill the same with meat. For, if the cylinder be swung upon its trunnions, the gear wheel 25 upon the shaft 26, lying over and meshing with the gear wheel 24 upon the shaft 15 rises therefrom with the tilting of the cylinder, and, upon the cylinder being returned to its horizontal position, said gear wheels again engage each other.

It is desirable to withdraw the plunger, and, for this purpose, upon the transverse shaft 12, is a gear wheel 44, which meshes with a gear wheel 45 loose upon the transverse shaft 18, and movable longitudinally on said transverse shaft within narrow limits. Said gear wheel 44 is secured to a clutch member 43, which can mesh with a second clutch member 46, fast upon the shaft 18. Said shaft 18 is also slightly movable longitudinally. When it is desired to withdraw the plunger, the shaft 18 is moved longitudinally so as to cause the clutch member 43 to engage the clutch member 46, and by means of a crank handle 47 applied to the shaft 18, said wheels are caused to turn, thereby turning the gear wheel 44, and operating the shaft 12, so that by the engagement of the pinions 11 with the racks 10, the plunger is withdrawn.

Important advantages possessed by my improved machine are due to the facts that the shaft which carries the cutting blades extends into the cylinder from the outside through the perforated plate, and that the cutting blades thereon are curved and cut the meat with a shearing or draw cut; also from the fact that the perforated plate is secured to the end of the cylinder from the outside, thus saving the space within the cylinder which is occupied by annular flanges or similar elements when the perforated plate is moved into place at the end of the cylinder in the inside thereof.

I claim:—

In an apparatus of the character described, the combination of a frame, a cylinder pivotally mounted on said frame, a cutter located in said cylinder at one end thereof, a shaft upon which said cutter is mounted and passing centrally through said end of the cylinder, a bearing on the top of said cylinder, a longitudinal shaft in said bearing, an operative connection between said longitudinal and cutter shafts, a plunger, means for advancing said plunger, a gear wheel in said longitudinal shaft, a second gear wheel and an operative connection between said advancing means and the second gear wheel, whereby they are actuated in unison, said second gear wheel being adapted to mesh with the first gear wheel, when the cylinder is axially in line with the plunger, substantially as described.

In testimony whereof I have hereunto set my hand in the presence of two subscribing witnesses.

JOHN MASSON.

Witnesses:
 F. N. WRIGHT,
 D. B. RICHARDS.

---

Copies of this patent may be obtained for five cents each, by addressing the "Commissioner of Patents. Washington. D. C."